US012155688B2

(12) United States Patent
Belton, Jr. et al.

(10) Patent No.: US 12,155,688 B2
(45) Date of Patent: *Nov. 26, 2024

(54) END-OF-LIFE MANAGEMENT SYSTEM

(71) Applicant: WELLS FARGO BANK, N.A., San Francisco, CA (US)

(72) Inventors: Lawrence T. Belton, Jr., Charlotte, NC (US); Ryan B. Benskin, Charlotte, NC (US); Peter A. Makohon, Huntersville, NC (US); Timothy H. Morris, Lexington, NC (US); Christopher J. Houser, Mount Holly, NC (US); Douglas C. Rambo, Davidson, NC (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/485,414

(22) Filed: Oct. 12, 2023

(65) Prior Publication Data

US 2024/0039950 A1 Feb. 1, 2024

Related U.S. Application Data

(63) Continuation of application No. 17/070,504, filed on Oct. 14, 2020, now Pat. No. 11,824,885, which is a continuation of application No. 15/598,753, filed on May 18, 2017, now Pat. No. 10,812,518.

(51) Int. Cl.
*H04L 9/40* (2022.01)
*G06F 9/44* (2018.01)

(52) U.S. Cl.
CPC ............ *H04L 63/1433* (2013.01); *G06F 9/44* (2013.01); *H04L 63/1441* (2013.01)

(58) Field of Classification Search
CPC .... H04L 63/1433; H04L 63/1441; G06F 9/44
See application file for complete search history.

(56) References Cited

U.S. PATENT DOCUMENTS

| | | | |
|---|---|---|---|
| 6,151,643 A * | 11/2000 | Cheng | G06F 8/61 709/200 |
| 7,191,435 B2 * | 3/2007 | Lau | H04L 67/306 717/121 |
| 7,672,921 B1 * | 3/2010 | Clay | G06Q 10/06 706/45 |
| 8,015,114 B1 * | 9/2011 | Nachenberg | G06F 21/564 705/59 |
| 8,321,352 B1 * | 11/2012 | Rameshkumar | G06F 21/12 713/153 |
| 8,341,617 B2 | 12/2012 | Bunn | |
| 8,621,353 B2 * | 12/2013 | Schlarb | H04N 21/25816 715/725 |

(Continued)

*Primary Examiner* — Jason Chiang
(74) *Attorney, Agent, or Firm* — Kilpatrick Townsend & Stockton LLP

(57) ABSTRACT

Network entities of a network system are managed in an end-of-life context. A network system is scanned to determine network entities such as hardware devices and/or software applications. A network entity can be identified as vulnerable based on end-of-life data. A risk score for the vulnerable network entity is computed based on the end-of-life data and optionally other factors, and a potentially mitigating action is determined based on the risk score.

20 Claims, 6 Drawing Sheets

(56) References Cited

U.S. PATENT DOCUMENTS

| | | | |
|---|---|---|---|
| 8,713,525 B2 | 4/2014 | Attalla | |
| 8,838,964 B2* | 9/2014 | Gregorovic | G06F 8/61 |
| | | | 726/28 |
| 8,914,783 B2* | 12/2014 | Van Camp | G06F 8/65 |
| | | | 717/169 |
| 8,997,078 B2* | 3/2015 | Spivak | G06F 8/65 |
| | | | 717/173 |
| 9,207,982 B2* | 12/2015 | Barnes | G06F 9/50 |
| 9,330,357 B1* | 5/2016 | Ferdowski | G06Q 10/0635 |
| 9,535,685 B1* | 1/2017 | Wang | G06F 8/61 |
| 9,985,823 B1* | 5/2018 | Holenstein | H04L 41/0661 |
| 10,812,518 B1 | 10/2020 | Belton, Jr. et al. | |
| 2003/0014287 A1* | 1/2003 | Williams | G06Q 10/087 |
| | | | 705/7.31 |
| 2003/0033179 A1* | 2/2003 | Katz | G06Q 10/0631 |
| | | | 705/7.41 |
| 2003/0058277 A1* | 3/2003 | Bowman-Amuah | |
| | | | G06F 16/289 |
| | | | 715/765 |
| 2003/0095648 A1* | 5/2003 | Kaib | A61B 5/0006 |
| | | | 379/106.02 |
| 2004/0210653 A1* | 10/2004 | Kanoor | G06F 8/65 |
| | | | 707/999.203 |
| 2005/0091004 A1* | 4/2005 | Parlos | G05B 23/0283 |
| | | | 714/E11.02 |
| 2005/0120112 A1* | 6/2005 | Wing | G06Q 10/06 |
| | | | 709/224 |
| 2005/0187744 A1* | 8/2005 | Morrison | G06Q 10/06 |
| | | | 703/2 |
| 2007/0156495 A1* | 7/2007 | King | G06Q 40/08 |
| | | | 705/7.38 |
| 2008/0133300 A1* | 6/2008 | Jalinous | G06Q 10/0637 |
| | | | 705/7.29 |
| 2008/0189788 A1* | 8/2008 | Bahl | H04L 63/1416 |
| | | | 726/25 |
| 2008/0222604 A1* | 9/2008 | Murphy | G06F 8/65 |
| | | | 717/120 |
| 2008/0222626 A1* | 9/2008 | Kumar Hirsave | G06F 11/3466 |
| | | | 717/168 |
| 2008/0270202 A1* | 10/2008 | Krempel | G06Q 10/06 |
| | | | 705/30 |
| 2008/0300899 A1* | 12/2008 | Brown | H04N 1/2346 |
| | | | 705/1.1 |
| 2008/0300933 A1* | 12/2008 | Britton | G06Q 10/06 |
| | | | 705/30 |
| 2009/0024425 A1* | 1/2009 | Calvert | G06Q 10/06315 |
| | | | 705/7.36 |
| 2009/0099963 A1* | 4/2009 | Mathieu | G06Q 30/06 |
| | | | 705/39 |
| 2009/0119029 A1* | 5/2009 | Voigtlaender | G05B 19/4065 |
| | | | 702/34 |
| 2009/0217381 A1* | 8/2009 | Helman | G06F 21/577 |
| | | | 726/25 |
| 2009/0300602 A1* | 12/2009 | Burke | G06F 8/61 |
| | | | 717/177 |
| 2010/0121955 A1* | 5/2010 | Doganaksoy | H04L 43/16 |
| | | | 709/226 |
| 2010/0257043 A1* | 10/2010 | Kassaei | G06Q 30/02 |
| | | | 705/26.1 |
| 2011/0239189 A1* | 9/2011 | Attalla | G06F 8/65 |
| | | | 717/121 |
| 2012/0116747 A1* | 5/2012 | Hadar | G06Q 10/06312 |
| | | | 703/22 |
| 2014/0007070 A1* | 1/2014 | Huang | G06F 8/65 |
| | | | 717/170 |
| 2014/0254050 A1* | 9/2014 | Haines | H02H 3/16 |
| | | | 361/42 |
| 2014/0337086 A1* | 11/2014 | Asenjo | G06F 3/0635 |
| | | | 705/7.28 |
| 2014/0380484 A1* | 12/2014 | Choi | G06F 21/552 |
| | | | 726/25 |
| 2015/0171835 A1* | 6/2015 | Gentner | H03K 5/1565 |
| | | | 327/175 |
| 2015/0227363 A1* | 8/2015 | Pillgram-Larsen | G06F 8/71 |
| | | | 717/122 |
| 2015/0278374 A1* | 10/2015 | Van De Poel | G06F 16/9535 |
| | | | 707/722 |
| 2016/0026960 A1* | 1/2016 | Carnahan | G06Q 10/06393 |
| | | | 705/7.39 |
| 2016/0063417 A1* | 3/2016 | Mandalia | G06F 16/24578 |
| | | | 705/7.25 |
| 2016/0069919 A1* | 3/2016 | Holmes | G01N 21/51 |
| | | | 435/14 |
| 2016/0112445 A1* | 4/2016 | Abramowitz | G06Q 40/08 |
| | | | 726/23 |
| 2016/0119373 A1* | 4/2016 | Fausto | H04L 63/1433 |
| | | | 726/25 |
| 2016/0282859 A1* | 9/2016 | Wilber | G05B 19/41875 |
| 2016/0371071 A1* | 12/2016 | Reese | H04L 67/34 |
| 2016/0373478 A1* | 12/2016 | Doubleday | G06F 8/65 |
| 2017/0054605 A1* | 2/2017 | Duncan | H04L 41/145 |
| 2017/0083822 A1* | 3/2017 | Adendorff | G06F 11/0793 |
| 2017/0195866 A1* | 7/2017 | Kim | H04W 12/08 |
| 2017/0207981 A1* | 7/2017 | Maguire | H04L 41/5009 |
| 2018/0062941 A1* | 3/2018 | Brown | H04L 41/5032 |
| 2018/0077188 A1* | 3/2018 | Mandyam | H04L 67/01 |
| 2018/0082059 A1* | 3/2018 | Bender | H04L 63/1425 |
| 2018/0124072 A1* | 5/2018 | Hamdi | G06F 21/577 |
| 2018/0124094 A1* | 5/2018 | Hamdi | G06F 7/24 |
| 2018/0130018 A1* | 5/2018 | Sreenivasamurthy | |
| | | | G06F 11/1446 |
| 2018/0143257 A1* | 5/2018 | Garcia | G01R 31/382 |
| 2018/0219891 A1* | 8/2018 | Jain | H04L 63/1425 |
| 2018/0260827 A1* | 9/2018 | Sullivan | G06N 3/084 |

* cited by examiner

END-OF-LIFE MANAGEMENT SYSTEM

CROSS REFERENCE TO RELATED APPLICATIONS

This application is a continuation of U.S. patent application Ser. No. 17/070,504, filed Oct. 14, 2020, and entitled "END-OF-LIFE MANAGEMENT SYSTEM," which is a continuation of U.S. patent application Ser. No. 15/598,753, filed May 18, 2017, issued as U.S. Pat. No. 10,812,518, and entitled "END-OF-LIFE MANAGEMENT SYSTEM," the entirety of each of which is incorporated herein by reference.

BACKGROUND

Managing increasingly large networks is becoming more important. In a given network there are an increasing number of network entities available over the network, in particular, hardware entities, software applications, and/or the like. However, such access can be dangerous for the network providers. A network operating an outdated network entity or has not been updated for crucial security patches is susceptible to malware that can damage a network, compromise important data, and/or disable critical features.

SUMMARY

The following presents a simplified summary in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

A method is disclosed herein that performs operations including scanning a network system to identify one or more network entities comprising the network system, identifying at least one of the one or more network entities as a vulnerable network entity based on end-of-life information, computing a risk score for the vulnerable network entity based on the end-of-life information and a measure of business stability of a vendor associated with the vulnerable network entity, and determining a potential mitigating action based on the risk score.

A system is disclosed that includes a processor couple to a memory that stores instructions that, when executed by the processor, cause the processor to scan scan a network system to reveal one or more network entities comprising the network system, identify at least one of the one or more network entities as a vulnerable network entity based on end-of-life data, compute a risk score for the vulnerable network entity based on the end-of-life data and a measure of business stability of a vendor associated with the vulnerable network entity, and determine a potential mitigating action based on the risk score.

Another method is disclosed comprising executing, on a processor, instructions that cause the processor to perform a plurality of operations. The operations include identifying at least one of one or more network entities comprising a network system as a vulnerable network entity based on end-of-life data, computing a risk score for the vulnerable network entity based on the end-of-life data and a measure of business stability of a vendor associated with the vulnerable network entity, determining a potential mitigating action based on the risk score, and recommending performance of the potential mitigation action.

In aspects, the subject innovation provides substantial benefits in terms of managing network entities. One advantage resides in a more comprehensive understanding of end-of-life situations regarding network entities. Another advantage resides in identifying and predicting vulnerabilities in network entities that can damage a network. Yet another advantage resides in a better allocation of resources for network entities that are not end-of-life.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

BRIEF DESCRIPTION OF THE DRAWINGS

Aspects of the disclosure are understood from the following detailed description when read with the accompanying drawings. It will be appreciated that elements, structures, etc. of the drawings are not necessarily drawn to scale. Accordingly, the dimensions of the same may be arbitrarily increased or reduced for clarity of discussion, for example.

DETAILED DESCRIPTION

Figure 1:
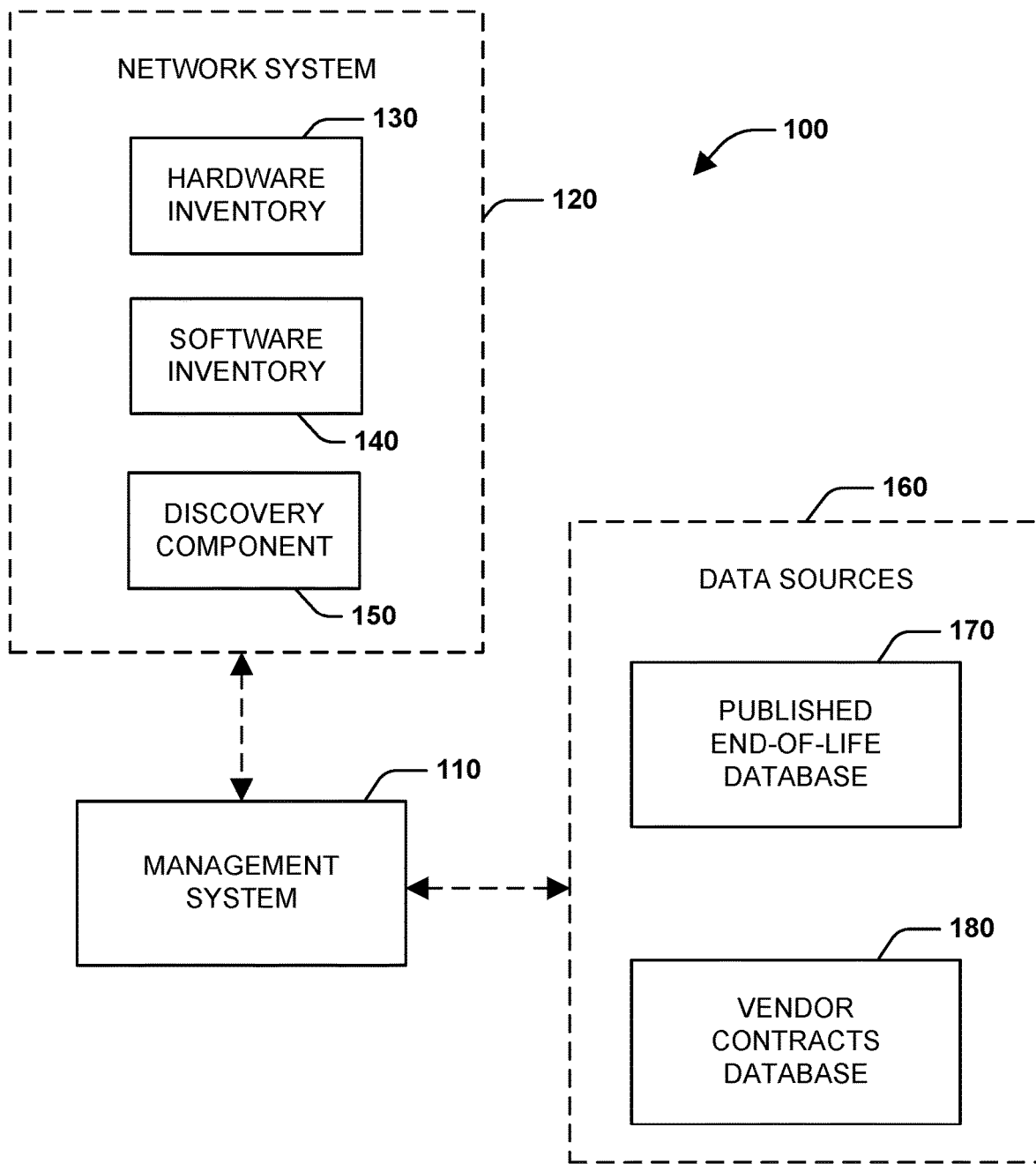
FIG. 1 illustrates an example component diagram of a system according to the innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Furthermore, the claimed subject matter can be implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

While certain ways of displaying information to users are shown and described with respect to certain figures as screenshots, those skilled in the relevant art will recognize that various other alternatives can be employed. The terms "screen," "web page," "screenshot," and "page" are generally used interchangeably herein. The pages or screens are stored and/or transmitted as display descriptions, as graphical user interfaces, or by other methods of depicting information on a screen (whether personal computer, PDA, mobile telephone, or other suitable device, for example) where the layout and information or content to be displayed on the page is stored in memory, database, or another storage facility.

FIG. 1 illustrates a system 100 for end-of-life (EOL) tracking and alerting. The system 100 includes a management system 110. The management system 110 manages EOL data, notifications, and actions for the system 100. The management system 110 can monitor and/or scan a network system 120. The management system 110 can continuously or intermittently scan the network system 120 for network entities. The network system 120 can be a network for a business, a private network, a public network, and/or the like. The network system 120 includes a hardware inventory 130 and/or a software inventory 140. In some embodiments, the hardware inventory 130 and software inventory 140 are databases of each hardware and software application available or being used on the network system 120 and are updated to be accessed by the management system 110. For example, the hardware inventory 130 can include servers, switches, databases, and/or the like. The software inventory 140 can include spreadsheet applications, file management applications, anti-virus applications, network management applications, and/or the like.

The network system 120 can include a discovery component 150 that discovers new network entities in the network system 120. The discovery component 150 can update the hardware inventory 130 and software inventory 140 accordingly. In other embodiments, the management system 110 can search the network system 120 for hardware and software applications. The search may be periodic or performed on a rolling basis.

The management system 110 can query data sources 160 to retrieve EOL data and other data about the hardware and software applications of the network system 120. The data sources 160 can include a published EOL database 170. The published EOL database 170 includes data provided by vendors about hardware and/or software. The data can be updates, version history, EOL data, and/or the like. The EOL data is data regarding whether a vendor is maintaining support for the product or discontinuing support. In some embodiments, the EOL data is a product life-cycle plan that is created by the vendor for a specific product. The life-cycle plan can facilitate predicting when the product, i.e. hardware and/or software, will become obsolete or out of date. In other embodiments, the EOL data can include end-of-sale data. The end-of-sale data can be a factor for predicting a potential transition of a product into EOL status. Further, end of sale data can factor into a cost-benefit analysis. For example, a product has reached end-of-sale, support for the product tends to increase in price.

In some embodiments, the management system 110 can search the published EOL data 170 periodically or on an as needed basis. In other embodiments, the management system 110 can subscribe to the published EOL database 170 to receive updates to EOL data for the hardware inventory 130 and software inventory 140. For example, a software application is created and supported by Company X. Company X can maintain EOL data in the published EOL database 170. The software application is used by the network system 120 and is therefore in the software inventory 140. The management system 110 can detect the software application as part of the network system 120 and can establish a subscription to the software application's EOL data in the published EOL database 170. The management system 110 can receive alerts about updated data or information that Company X provides regarding the software application, including if Company X decides to no longer support or sell the software application.

The data sources 160 can include a vendor contracts database 180. The vendor contracts database 180 include data about a support relationship between the vendor and the network system 120 or owner of the network system, e.g. a financial institution, business, and/or the like. The data can include commencement date, termination date, duration of contract, support responsibilities, alternative solutions, redundancies, and/or the like. The management system 110 can retrieve the vendor contract data from the vendor contracts database 180 to facilitate management and determinations regarding the network entities. For example, Company X forms a vendor contract with a Financial Institution for the software application. The vendor contract details are stored in the vendor contracts database 180. The vendor contract 180 can affect the decisioning performed by the management system 110 when it encounters an EOL scenario. For example, the software application will no longer be supported by the vendor according to the published EOL database 170. However, the vendor contract data details that Company X must provide support of the software application to the business for the duration of the contract. The management system 110 can recommend continuing use of the software application on the network system 120 until the duration of the contract.

Figure 2:
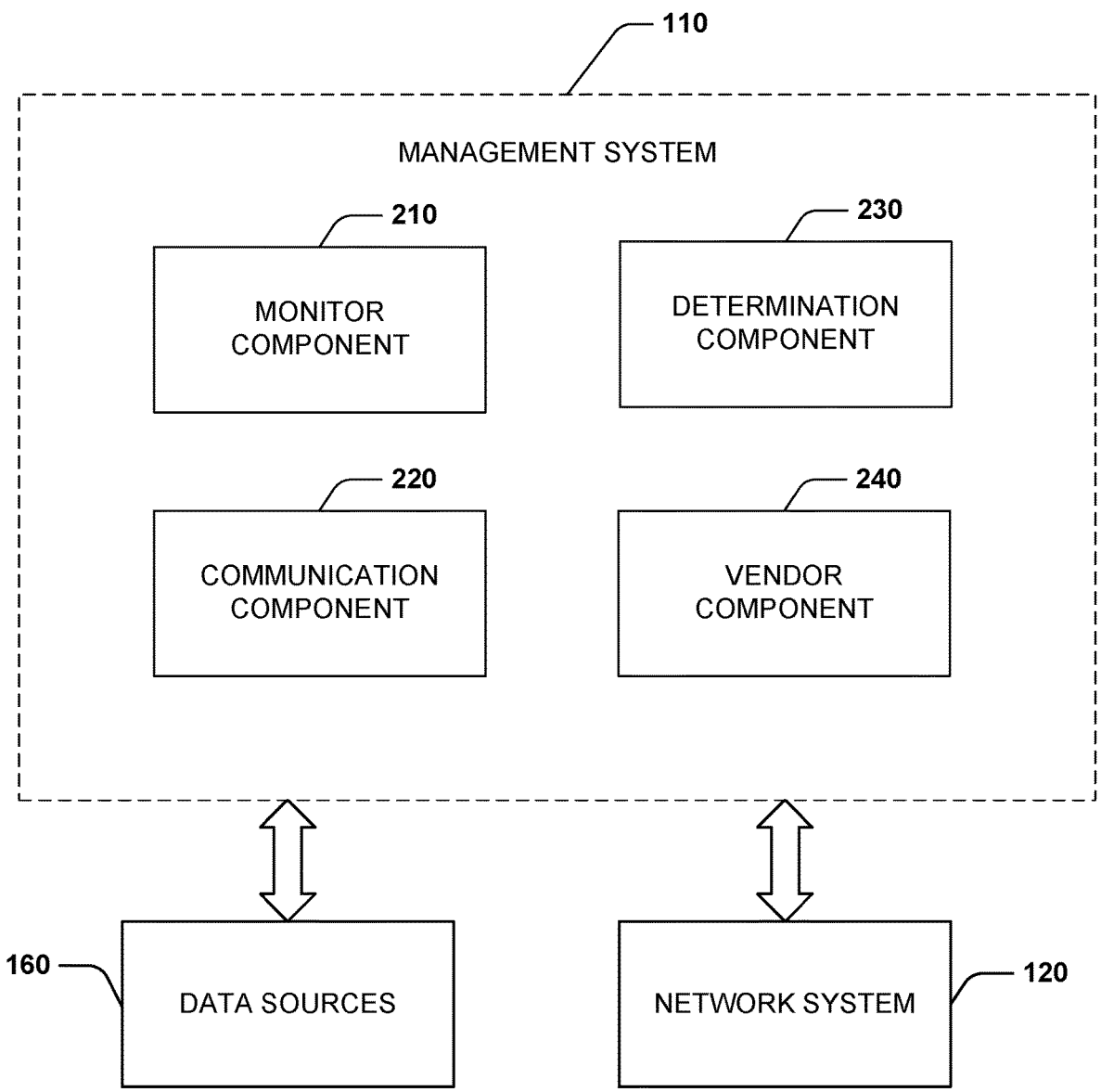
FIG. 2 illustrates an example component diagram of a management system.

FIG. 2, with continuing reference to FIG. 1, illustrates a detailed component diagram of the management system 110. The management system 110 includes a monitor component 210. The monitor component 210 can detect network entities on the network system 120, for example, a software application. The monitor component 210 can alert the management system 110 and/or other components in the management system 110 when a new network entity is detected. In some embodiments, the monitor component 210 can collect information about the network system 120. The information collected can include vendor (company), version, date added/detected, installation address, IP address, and/or the like.

The management system 110 includes a communication component 220. The communication component 220 establishes a data connection between the network system 120, the data sources 160, and the management system 110. The communication component 220 can send and receive data via a wireless local area network (LAN), wired LAN, TCP/IP protocol, application programming interface (API) call and response, and/or the like. The management component 150 via the communication component 210 can query the data sources 160 as described above. In some embodiments, the communication component 220 can alert a user, e.g. a network technician, regarding updates to published EOL data, vendor contracts, network entities, and/or the like.

The management system 110 includes a determination component 230. The determination component 230 determines potential mitigating actions for network entities based on EOL data and vendor contract data from the data sources 160. The determination component 230 determines whether a network entity in the network inventory is vulnerable or secure. The determination based on the end-of-life information and the network entity. The determination component 230 can compare the data collected of network entities to the published EOL data received from the data sources 160. The determination component 230 determines whether a network entity is secure. The determination component 230 determines the security of the network entity based on the comparison and EOL data.

The determination component 230 determines mitigating actions for the network entities. The mitigating actions can be one of or a combination of: limiting network access/traffic, seeking alternatives to replace the network entity, closely monitoring the network entity for potential issues, and/or the like.

In some embodiments, the determination component 230 can factor a cost-benefit analysis in determining mitigating actions. For example, the determination component 230 can calculate the cost of replacing a software application that has reached EOL status against purchasing an extended support contract from the vendor or other party.

The management system 110 includes a vendor component 240. The vendor component 240 can create a schedule for maintaining vendor contracts. The vendor component 240 creates a schedule to renew vendor contracts, cancel vendor contracts, alter vendor contracts, and/or the like. In one example, the vendor component 240 can cancel a vendor contract for a software application that has reached end-of-life and will no longer be supported by the vendor. In another example, the vendor component can alert a technician for review of a vendor decision to end sales of a particular network entity.

In some embodiments, the vendor component 240 can utilize machine learning to learn tendencies of particular vendors in relation to EOL data updates made by the vendor. The vendor component 240 can use the learned tendencies to predict when a hardware or software application is likely to reach EOL. For example, a vendor contract for a software application is due for renewal or cancelation. The vendor component 240 can predict, or anticipate, that software application is likely to reach EOL status during the time of a renewed contract. The vendor component 240 bases the prediction on the tendencies of the vendor behavior towards other software applications or hardware provided by the vendor. The vendor component 240 can make a recommendation to either not renew the vendor contract or recommend a strengthened guarantee of support for the software application during the renewed contract.

Figure 3:
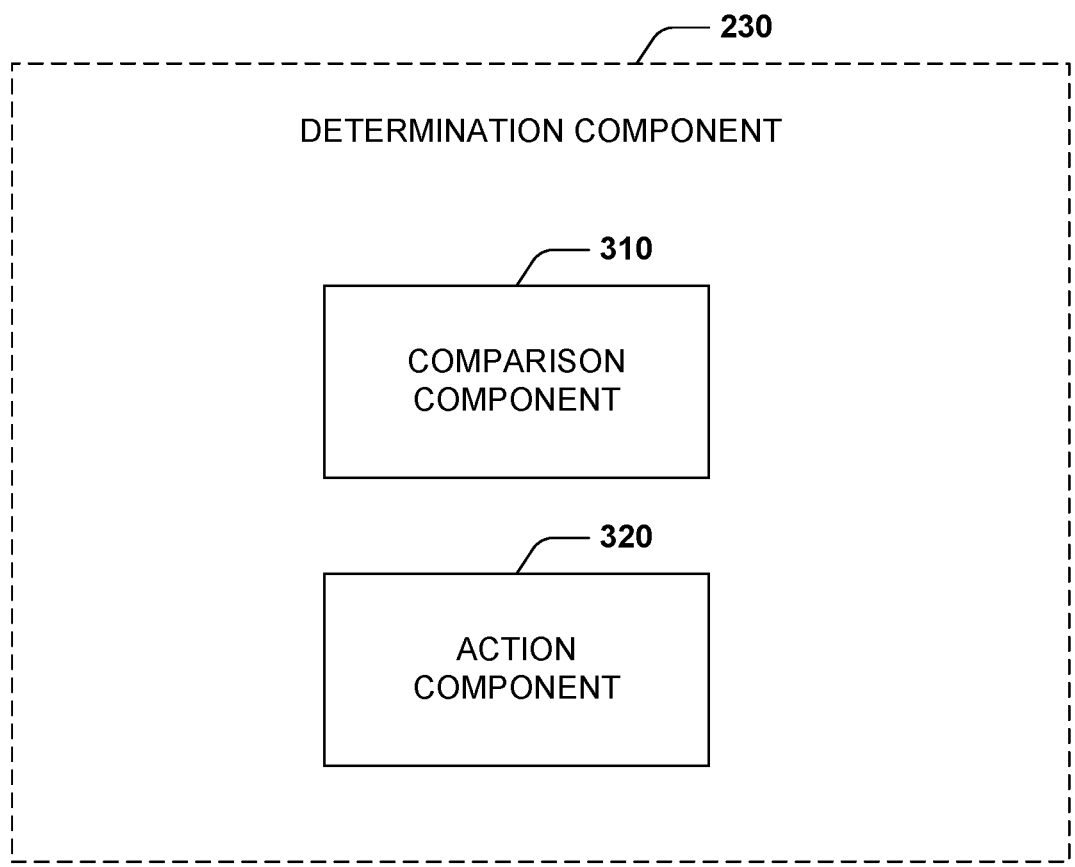
FIG. 3 illustrates an example component diagram of a determination component.

FIG. 3, with continuing reference to FIG. 2, illustrates a detailed view of the determination component 230. The determination component 230 includes a comparison component 310. The comparison component 310 can compare version information to data sources, the data sources having EOL information regarding the network inventory. The comparison can facilitate the determination component 230 in making a determination of mitigating actions. For example, if a particular version of a software application is EOL but a new version of the software is available from the vendor, the determination component 230 can select a mitigating action of updating to the latest version of the software application based on the comparison.

The determination component 230 includes an action component 320. The action component 320 determines mitigating actions based on the security determination of a network entity. In some embodiments, the action component determines mitigating actions based on a calculated risk score of the network entity. The calculated risk score can be based on the published EOL data. The calculated risk score can be further based on vendor contract and/or vendor contract context. The calculated risk score may be based on further factors such as business stability of the vendor, missing or out of date published EOL data, and/or the like.

In some embodiments, the action component 320 compares the calculated risk score according to a threshold score above which mitigating actions are triggered. In other embodiments, there are multiple thresholds between which a mitigating action (or actions) is triggered. For example, the calculated risk score can be normalized to a scale of 0-100, with 100 being the most at risk and 0 having little or no risk. A risk score over 90 can return a recommendation of removal of the network entity. A risk score between 80 and 89 can trigger automatically limiting network traffic to the network entity.

In some embodiments, the action component 320 can compile a ranking of each network entity of the network system 120. Based on the ranking, the action component 320 can determine mitigating actions for network entities. For example, the network entities with higher rankings will be susceptible to increased scrutiny over lower ranked network entities.

The mitigating actions can be replacement of the network entity, limit network traffic, increased security monitoring, trigger security audits by technicians or automated audits, and/or the like. In the case of a software application, the action component 320 can generate a prioritized dashboard for software removal. The dashboard can pop up on a technician computer with the recommendation for removal, the calculated risk score, retrieved data, and/or the like. The dashboard can direct the technician to confirm removal or trigger the technician to review the details further before confirming removal.

Figure 4:
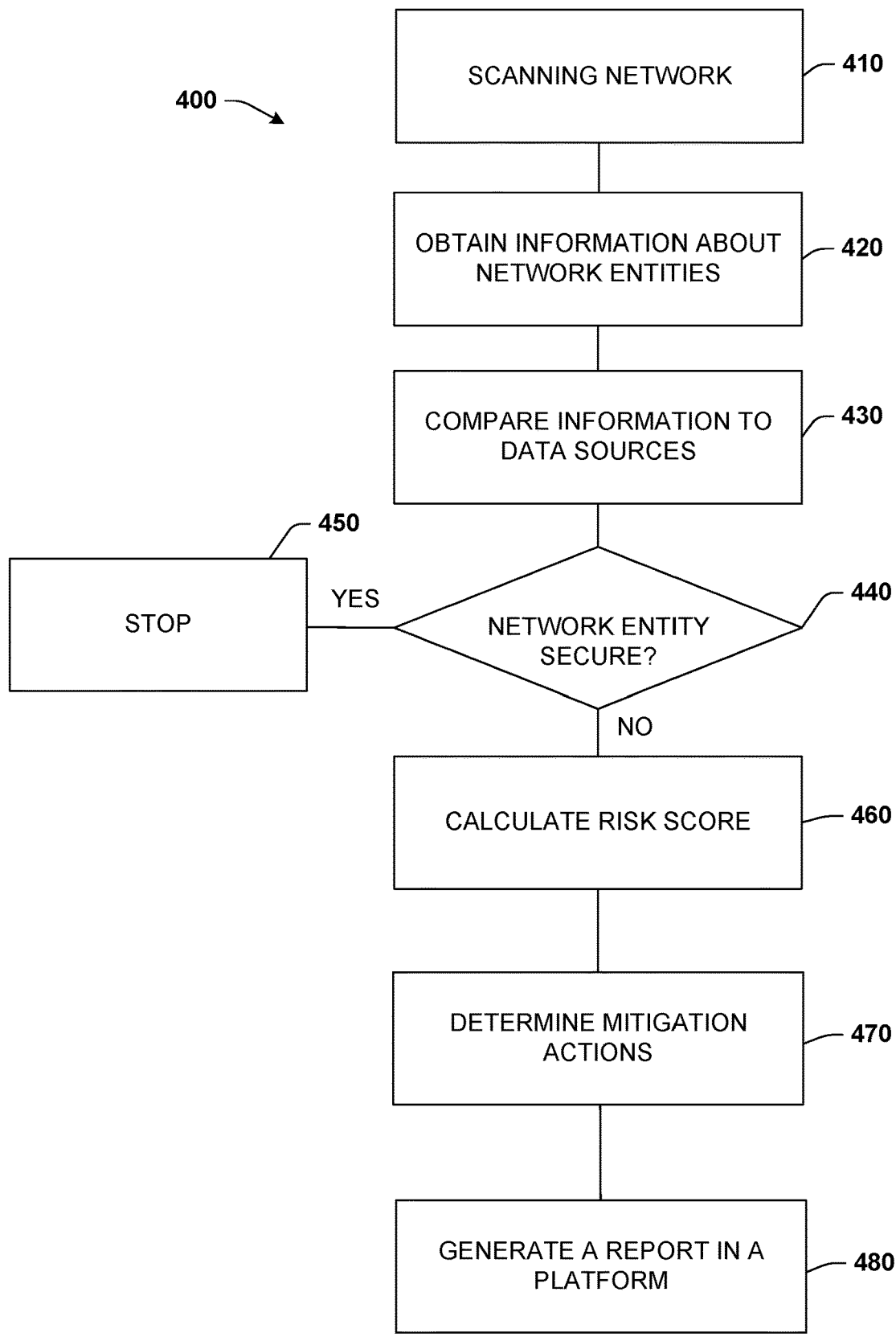
FIG. 4 illustrates a method for managing network entities.

With reference to FIG. 4, example method 400 is depicted for managing network entities. While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. It is also appreciated that the method 400 is described in conjunction with a specific example is for explanation purposes.

FIG. 4 illustrates a method 400 for managing network entities. At 410, a network system is scanned to retrieve network entities residing on the network system. For example, a business uses a network that employs network entities such as computers, servers, printers, switches, routers, spreadsheet software, design software, financial software, anti-virus software, and/or the like. The network is scanned to compile a network inventory that includes each network entity. The network scan can reveal a software application used by a computer on the network.

At 420, information about the network entities is collected. For example, the information can include version number, installation date, vendor, IP address, and/or the like. In the example, the version number of the software application is retrieved. At 430, the collected information is compared to data sources having EOL data. EOL data can be accessed from published sources such as the vendor or creator of the network entity. In the example, the version number of the software application is compared to published EOL data of the creator of the software application.

At 440, a determination is made regarding the vulnerability of the network entity. The determination is based on the previous comparison at 430 and other factors. If the network entity is secure, the method stops at 450. If the network entity is vulnerable, the method proceeds at 460. In the example, if the software application is determined to be up to date and projected for continued future support, the method stops. If the software application is determined to have reached EOL status by analyzing the creator's published EOL data, the software is determined to be vulnerable.

At 460, a risk score is calculated for each network entity that is not secure. The risk score can be calculated based on factors such as the vendor contract. Other factors can include vendor contract context, price, alternatives, importance to the network, overall network footprint (i.e. number of instances of the network entity being used), and/or the like. In the example, the vendor contract is determined to expire in two years, despite having reached EOL status. The risk score is calculated has higher due to the fact that the contract continues for a relatively long period after the software application will not be supported.

At 470, mitigation actions are determined. The mitigating actions are based on the calculated risk score. The calculated risk score can be normalized to a scale of 0-100, with 100 being the most at risk and 0 having little or no risk. In the example, the software application returns a risk score between 80 and 89. The risk score triggers automatically limiting network traffic to the software application. At 480, a report can be generated and provided in a platform or dashboard for review by a technician. The report can include relevant information and further actions to be carried about by the technician. In some embodiments, machine learning can be used for any further actions taken by the technician in order to more accurately calculate risk scores and/or recommend mitigating actions.

Figure 5:
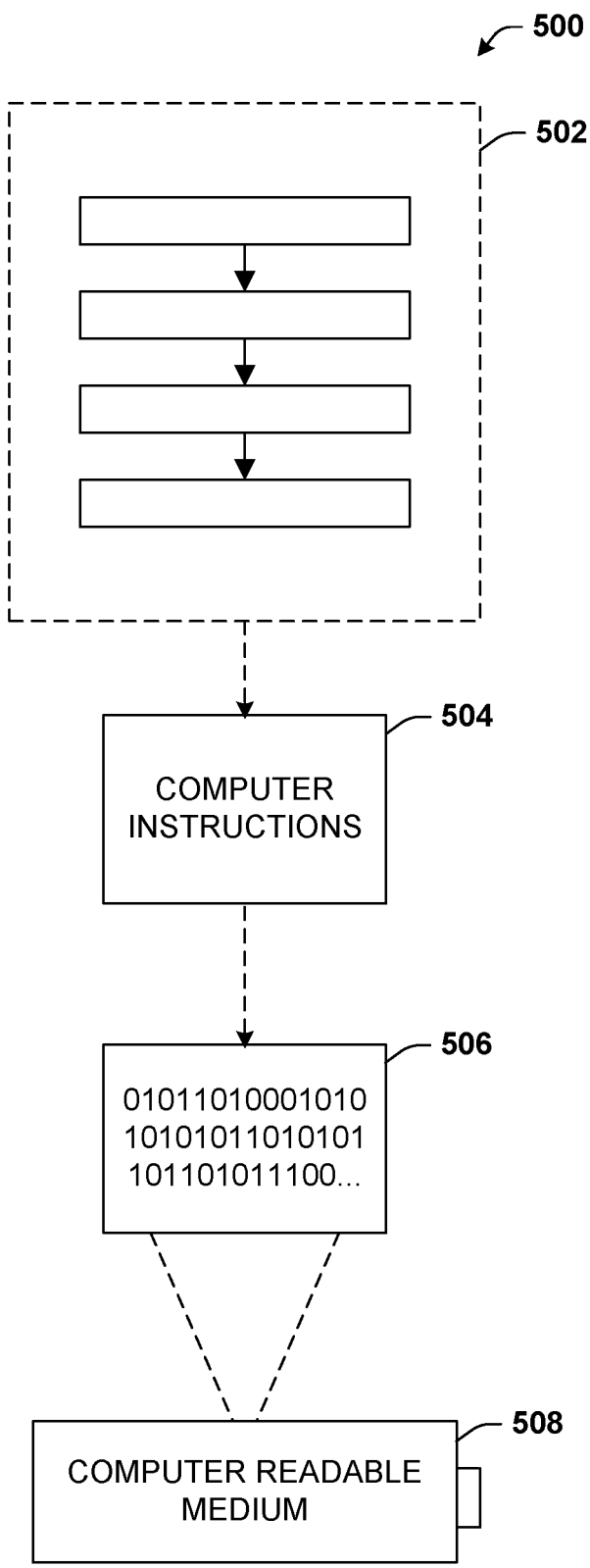
FIG. 5 illustrates a computer-readable medium or computer-readable device comprising processor-executable instructions configured to embody one or more of the provisions set forth herein, according to some embodiments.

Still another embodiment can involve a computer-readable medium comprising processor-executable instructions configured to implement one or more embodiments of the techniques presented herein. An embodiment of a computer-readable medium or a computer-readable device that is devised in these ways is illustrated in FIG. 5, wherein an implementation 500 comprises a computer-readable medium 508, such as a CD-R, DVD-R, flash drive, a platter of a hard disk drive, etc., on which is encoded computer-readable data 506. This computer-readable data 506, such as binary data comprising a plurality of zero's and one's as shown in 506, in turn comprises a set of computer instructions 504 configured to operate according to one or more of the principles set forth herein. In one such embodiment 500, the processor-executable computer instructions 504 is configured to perform a method 502, such as at least a portion of one or more of the methods described in connection with embodiments disclosed herein. In another embodiment, the processor-executable instructions 504 are configured to implement a system, such as at least a portion of one or more of the systems described in connection with embodiments disclosed herein. Many such computer-readable media can be devised by those of ordinary skill in the art that are configured to operate in accordance with the techniques presented herein.

Figure 6:
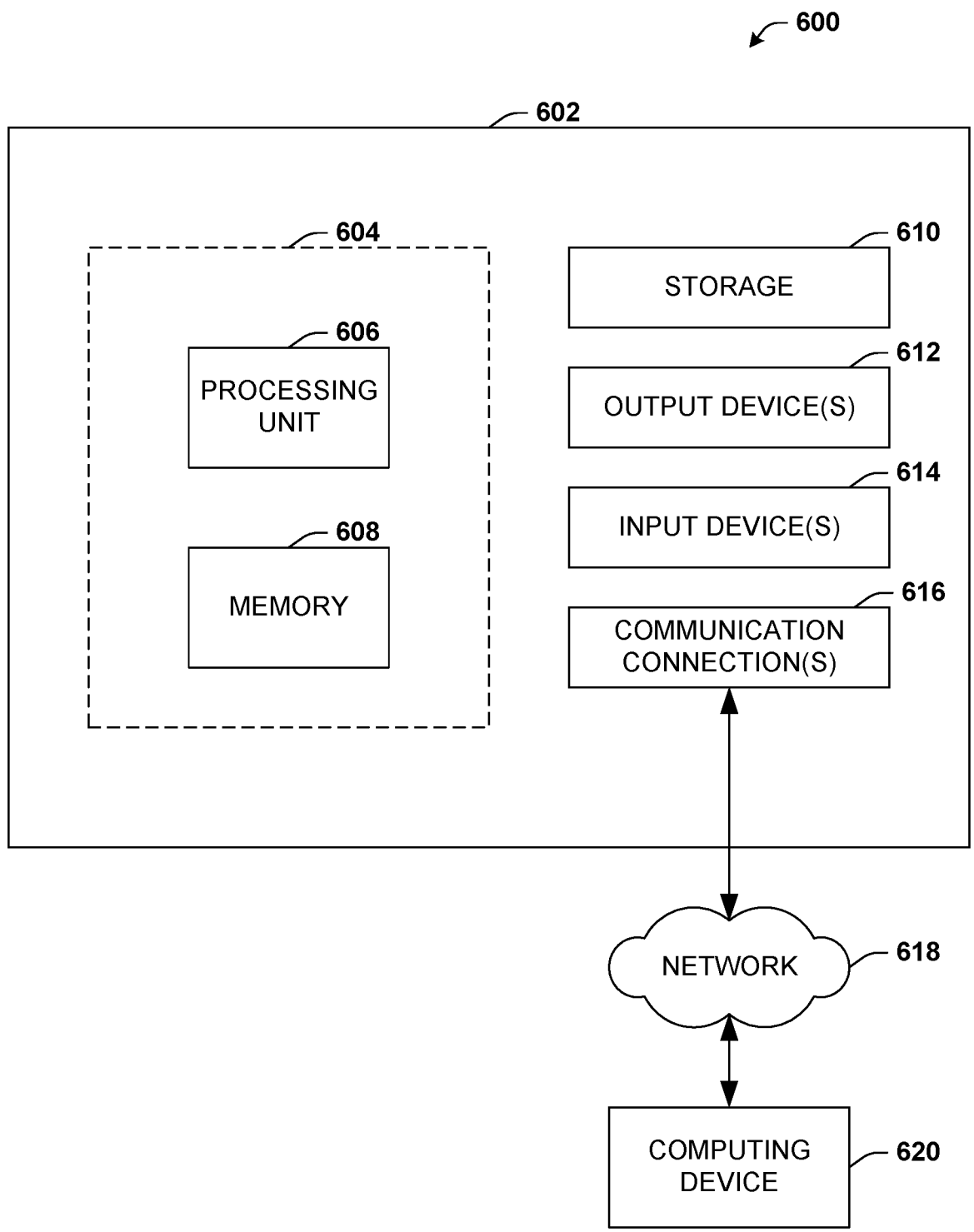
FIG. 6 illustrates a computing environment where one or more of the provisions set forth herein can be implemented, according to some embodiments.

With reference to FIG. 6 and the following discussion provide a description of a suitable computing environment in which embodiments of one or more of the provisions set forth herein can be implemented. The operating environment of FIG. 6 is only one example of a suitable operating environment and is not intended to suggest any limitation as to the scope of use or functionality of the operating environment. Example computing devices include, but are not limited to, personal computers, server computers, hand-held or laptop devices, mobile devices, such as mobile phones, Personal Digital Assistants (PDAs), media players, tablets, and the like, multiprocessor systems, consumer electronics, mini computers, mainframe computers, distributed computing environments that include any of the above systems or devices, and the like.

Generally, embodiments are described in the general context of "computer readable instructions" being executed by one or more computing devices. Computer readable instructions are distributed via computer readable media as will be discussed below. Computer readable instructions can be implemented as program modules, such as functions, objects, Application Programming Interfaces (APIs), data structures, and the like, that perform particular tasks or implement particular abstract data types. Typically, the functionality of the computer readable instructions can be combined or distributed as desired in various environments.

FIG. 6 illustrates a system 600 comprising a computing device 602 configured to implement one or more embodiments provided herein. In one configuration, computing device 602 can include at least one processing unit 606 and memory 608. Depending on the exact configuration and type of computing device, memory 608 may be volatile, such as RAM, non-volatile, such as ROM, flash memory, etc., or some combination of the two. This configuration is illustrated in FIG. 6 by dashed line 604.

In these or other embodiments, device 602 can include additional features or functionality. For example, device 602 can also include additional storage such as removable storage or non-removable storage, including, but not limited to, magnetic storage, optical storage, and the like. Such additional storage is illustrated in FIG. 6 by storage 610. In some embodiments, computer readable instructions to implement one or more embodiments provided herein are in storage 610. Storage 610 can also store other computer readable instructions to implement an operating system, an application program, and the like. Computer readable instructions can be accessed in memory 608 for execution by processing unit 606, for example.

The term "computer readable media" as used herein includes computer storage media. Computer storage media includes volatile and nonvolatile, non-transitory, removable and non-removable media implemented in any method or technology for storage of information such as computer readable instructions or other data. Memory 608 and storage 610 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 602. Any such computer storage media can be part of device 602.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Device 602 can include one or more input devices 614 such as keyboard, mouse, pen, voice input device, touch input device, infrared cameras, video input devices, or any other input device. One or more output devices 612 such as one or more displays, speakers, printers, or any other output device can also be included in device 602. The one or more input devices 614 and/or one or more output devices 612 can be connected to device 602 via a wired connection, wireless connection, or any combination thereof. In some embodiments, one or more input devices or output devices from another computing device can be used as input device(s) 614 or output device(s) 612 for computing device 602. Device 602 can also include one or more communication connections 616 that can facilitate communications with one or more other devices 620 by means of a communications network 618, which can be wired, wireless, or any combination thereof, and can include ad hoc networks, intranets, the Internet, or substantially any other communications network that can allow device 602 to communicate with at least one other computing device 620.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method, comprising:
  receiving, by one or more processors, in response to querying, end-of-life information from the one or more data sources on a network system;
  identifying, by the one or more processors at least one network entity on the network system as a vulnerable network entity based on the end-of-life information and projected support of the network entities;
  computing, by the one or more processors a risk score for the vulnerable network entity based on the end-of-life information, and a measure of business stability of a vendor associated with the vulnerable network entity;
  determining, by the one or more processors a potential mitigating action based on the risk score, wherein execution of the potential mitigating action triggers limiting network access to the vulnerable network entity; and
  machine learning, by the one or more processors, a vendor tendency to predict when a network entity is likely to reach end-of-life based on vendor behavior towards other software applications or hardware provided by the vendor.

2. The method of claim 1, further comprising continuously scanning the network system for the network entities.

3. The method of claim 1, further comprising scanning the network system to identify the one or more network entities comprising at least one of a hardware or software entity.

4. The method of claim 1, further comprising identifying at least one of the one or more network entities as the vulnerable network entity based on the end-of-life information pertaining to whether a vendor is maintaining or discontinuing support.

5. The method of claim 1, further comprising identifying at least one of the one or more network entities as the vulnerable network entity based on a vendor contract.

6. The method of claim 1, further comprising predicting end-of-life based on historical data regarding a network entity.

7. The method of claim 1, further comprising performing cost benefit analysis with respect to two or more potential mitigating actions and selecting the action based on a result of the cost benefit analysis.

8. The method of claim 1, further comprising determining a schedule for managing end-of-life contracts, wherein the schedule predicts potential mitigating actions.

9. The method of claim 1, further comprising:
  altering a vendor contract according to the vendor tendency and a prediction about the network entity.

10. The method of claim 1, further comprising:
  determining the network entity is secure due to the network entity not reaching end-of-life status; and
  determining that mitigating actions are not required for the entity based on the network entity reaching end-of-life status.

11. A system comprising:
  a processor coupled to a memory that stores instructions that, when executed by the processor, cause the processor to:
  receive, in response to querying, end-of-life information from the one or more data sources on a network system;
  identify at least one network entity on the network system as a vulnerable network entity based on the end-of-life information and projected support of the network entities;
  compute a risk score for the vulnerable network entity based on the end-of-life information, and a measure of business stability of a vendor associated with the vulnerable network entity;
  determine a potential mitigating action based on the risk score, wherein execution of the potential mitigating action triggers limiting network access to the vulnerable network entity; and
  machine learn a vendor tendency to predict when a network entity is likely to reach end-of-life based on vendor behavior towards other software applications or hardware provided by the vendor.

12. The system of claim 11, further comprising instructions configured to cause the processor to continuously scan the network system for the network entities.

13. The system of claim 11, further comprising instructions configured to cause the processor to scan the network system to identify the one or more network entities comprising at least one of a hardware or software entity.

14. The system of claim 11, further comprising instructions configured to cause the processor to identify at least one of the one or more network entities as the vulnerable network entity based on the end-of-life information pertaining to whether a vendor is maintaining or discontinuing support.

15. The system of claim 11, further comprising instructions configured to cause the processor to identify at least one of the one or more network entities as the vulnerable network entity based on a vendor contract.

16. The system of claim 11, further comprising instructions configured to cause the processor to predict end-of-life based on historical data regarding a network entity.

17. The system of claim 11, further comprising instructions configured to cause the processor to perform cost benefit analysis with respect to two or more potential mitigating actions and selecting the action based on a result of the cost benefit analysis.

18. The system of claim 17, further comprising instructions configured to cause the processor to:
   determine the network entity is secure due to the network entity not reaching end-of-life status; and
   determine that mitigating actions are not required for the entity based on the network entity reaching end-of-life status.

19. The system of claim 11, further comprising instructions configured to cause the processor to determine a schedule for managing end-of-life contracts, wherein the schedule predicts potential mitigating actions.

20. A non-transitory computer readable medium comprising instructions that when executed by one or more processors cause the one or more processors to:
   receive, in response to querying, end-of-life information from the one or more data sources on a network system;
   identify at least one network entity on the network system as a vulnerable network entity based on the end-of-life information and projected support of the network entities;
   compute a risk score for the vulnerable network entity based on the end-of-life information, and a measure of business stability of a vendor associated with the vulnerable network entity;
   determine a potential mitigating action based on the risk score, wherein execution of the potential mitigating action triggers limiting network access to the vulnerable network entity; and
   machine learn a vendor tendency to predict when a network entity is likely to reach end-of-life based on vendor behavior towards other software applications or hardware provided by the vendor.

* * * * *